(12) United States Patent
Krishnan et al.

(10) Patent No.: US 9,081,832 B2
(45) Date of Patent: Jul. 14, 2015

(54) PROVIDING LEAF PAGE SUBLINKS IN RESPONSE TO A SEARCH QUERY

(71) Applicant: Google Inc., Mountain View, CA (US)

(72) Inventors: Raj Krishnan, New York, NY (US); Daniel Rocha, Manhattan, NY (US); Harvey Jones, Brooklyn, NY (US); Hannah Allison Johnston, Queens, NY (US); Jeremy Silber, New York, NY (US); Russ Yanofsky, New York, NY (US)

(73) Assignee: GOOGLE INC., Mountain View, CA (US)

( * ) Notice: Subject to any disclaimer, the term of this patent is extended or adjusted under 35 U.S.C. 154(b) by 203 days.

(21) Appl. No.: 13/833,454

(22) Filed: Mar. 15, 2013

(65) Prior Publication Data

US 2015/0154266 A1    Jun. 4, 2015

Related U.S. Application Data

(60) Provisional application No. 61/637,616, filed on Apr. 24, 2012.

(51) Int. Cl.
  G06F 17/30 (2006.01)
(52) U.S. Cl.
  CPC .............................. G06F 17/30554 (2013.01)

(58) Field of Classification Search
  CPC ................. G06F 17/30864; G06F 17/30696; G06F 17/30873
  USPC .................................................. 707/737, 752
  See application file for complete search history.

(56) References Cited

U.S. PATENT DOCUMENTS

| | | | |
|---|---|---|---|
| 7,054,870 B2 * | 5/2006 | Holbrook | 1/1 |
| 7,493,315 B2 * | 2/2009 | Holbrook | 1/1 |
| 7,555,476 B2 * | 6/2009 | Holbrook | 1/1 |
| 2005/0203918 A1 * | 9/2005 | Holbrook | 707/10 |
| 2006/0161535 A1 * | 7/2006 | Holbrook | 707/3 |
| 2007/0011146 A1 * | 1/2007 | Holbrook | 707/3 |
| 2007/0226640 A1 * | 9/2007 | Holbrook et al. | 715/765 |

* cited by examiner

*Primary Examiner* — Baoquoc N To
(74) *Attorney, Agent, or Firm* — Middleton Reutlinger (57) ABSTRACT

Methods and apparatus for providing leaf pages as sublinks for a webpage in response to a search query. A search query may be received from a user and search results obtained based on the search query. A plurality of leaf pages associated with a webpage of the search results may be identified. The webpage may be provided as a main search result to the search query and sublinks to the leaf pages may be provided as sublinks of the main search result. At least one category of the leaf pages may be identified and the sublinks to the leaf pages may be sorted according to a sorting scheme of the category.

24 Claims, 6 Drawing Sheets

| puppies and rainbows |

The Blog | Puppies and Rainbows
theblog.example_url.com

350 — A blog about events that are pertinent to puppies and rainbows...

The Greyhound Races
Jan. 21, 2012

351 — Example snippet data 1. Example snippet data 1. Example snippet data 1. Example snippet...

What Should Puppies Learn From Rainbows
Jan 19, 2012

352 — Example snippet data 2. Example snippet data 2. Example snippet data 2. Example snippet...

Re-Thinking The Leash Laws
Jan. 20, 2012

353 — Example snippet data 3. Example snippet data 3. Example snippet data 3. Example snippet data 3. Example snippet...

Dog Food
Dec. 24, 2011

354 — Example snippet data 4. Example snippet data 4. Example snippet data 4. Example snippet...

356 — More results from example_url.com

Puppy Information Central
www.exampleURL2.com/puppyinfo

Welcome! We have the advice you need to learn how to care for your new puppies...

Puppy Pictures
www.exampleURL3.com/puppypics

Browse our collection of the cutest puppy pics around.
Vote for your favorite puppies here...

Puppy Instructions
www.exampleURL4.com/puppycare

Caring for puppies can be broken down into three simple puppy steps. First make sure that...

FIG. 3

440 puppies and rainbows

The Blog | Puppies and Rainbows
theblog.example_url.com
450 — A blog about events that are pertinent to puppies and rainbows...
452

The Greyhound Races  What Should Puppies 
Jan. 21, 2012                                Learn From Rainbows
451 — Example snippet data 1                 Jan 19, 2012
Example snippet data 1. Example             Example snippet data 2. Example
snippet data 1. Example snippe...            snippet data 2. Example snippe...

Re-Thinking The Leash Laws                   Dog Food 
Jan. 20, 2012                                Dec. 24, 2011
453 — Example snippet data 3. Example        Example snippet data 4
snippet data 3. Example snippe...            Example snippet data 4. Examp...

456 — More results from example_url.com
454

Puppy Information Central
www.exampleURL2.com/puppyinfo

Welcome! We have the advice you need to learn how to care for your
new puppies...

Puppy Pictures
www.exampleURL3.com/puppypics

Browse our collection of the cutest puppy pics around.
Vote for your favorite puppies here...

Puppy Instructions
www.exampleURL4.com/puppycare

Caring for puppies can be broken down into three simple
puppy steps. First make sure that...

FIG. 4

540 puppy report

The Puppy Report | Puppy Central
anotherexample_url.com
550 → 5 hours ago - Puppies are relaxing, just ask the association of...

551 →  ▷12:15
Example Video Title1
Jan. 21, 2012
Example snippet data 1. Example snippet data 1. Example snippet data 1. Example snippet...

552 →  ▷7:09
Example Video Title 2
2 days ago
Example snippet data 2. Example snippet data 2. Example snippet data 2. Example snippet...

553 →  ▷10:10
Example Video Title 3
Jan. 20, 2012
Example snippet data 3. Example snippet data 3. Example snippet data 3. Example snippet...

554 →  ▷11:11
Example Video Title 4
Dec. 24, 2011
Example snippet data 4. Example snippet data 4. Example snippet data 4. Example snippet...

556 → More results from example_url.com

Example Title A
www.exampleURL2.com/sublinka 2 days ago - Example Snippet Data A. Example Snippet Data A. Example Snippet Data A...

Example Title B
www.exampleURL3.com/sublinkb 3 days ago - Example Snippet Data B. Example Snippet Data B. Example Snippet Data B...

PROVIDING LEAF PAGE SUBLINKS IN RESPONSE TO A SEARCH QUERY

CROSS REFERENCE TO RELATED APPLICATIONS

This application claims the benefit of U.S. Provisional Application No. 61/637,616 filed on Apr. 24, 2012, entitled "Providing Leaf Page Sublinks in Response to a Search Query," the disclosure of which is incorporated by reference herein in its entirety.

BACKGROUND

This specification is directed generally to providing sublinks in response to a search query submitted to a search engine. Search engines enable users to locate information in a large database. For example, Internet search engines enable users to access content such as images, articles, postings, text documents, and/or multimedia content accessible via a webpage in response to a search query submitted by a user.

Some search engines return search results that include links to webpages for various websites. A user may then select one of the links to a particular webpage to attempt to find one or more items of interest. The items of interest, however, may not be directly available on the webpage associated with the selected link. In such a case, the user may need to navigate from the selected webpage in order to find the actual webpage with the desired information. This may involve clicking through a number of webpages until the user is able to find the item of interest.

SUMMARY

The present disclosure is directed to methods and apparatus for providing sublinks to display in response to a search query. For example, some implementations are directed to methods and apparatus for providing a webpage as a main search result and providing a plurality of leaf page sublinks to display in combination with the main search result.

In some implementations a computer implemented method of providing leaf pages as sublinks for a webpage in response to a search query is described that includes the steps of: receiving a search query from a user; obtaining search results based on the search query; identifying a plurality of leaf pages associated with a webpage of the search results, wherein the plurality of leaf pages and the webpage are webpages in a same website, wherein the plurality of leaf pages are directed to at least one category of a plurality of predefined categories of content, and wherein at least some of the plurality of leaf pages are terminus webpages of the website's navigational hierarchy; providing the webpage as a main search result to the search query; providing sublinks to the plurality of leaf pages to display in combination with the main search result as sublinks of the main search result; and identifying the at least one category of the plurality of leaf pages and sorting the sublinks according to a sorting scheme of the category.

This method and other implementations of technology disclosed herein may each optionally include one or more of the following features.

The sorting scheme may be unique from a search result ordering scheme utilized to order the search results.

The category may include episodic video content and the sorting of the episodic content may be in reverse chronological order.

The category may include episodic video content and the sorting of the episodic content may be in chronological order.

The category may include news articles and the sorting of the news articles may be based on reverse chronological order.

The category may include at least one of a news story, an article, a review, a video, an image, an audio clip, a blog post, a forum, a review, a social networking profile page, and a product page.

The leaf pages may be children pages of section pages of the website.

The method may further include formatting display properties of the sublinks to provide an indication of the category of the leaf pages of the sublinks. The category may include news, video, and blog posting. The step of formatting the display of the sublinks to provide an indication of the category of the leaf pages may include formatting at least some news sublinks of the plurality of sublinks to include an image from the news leaf page and text from the news leaf page at least partially wrapped around the image. The text may be justified. The sublinks may be formatted in multiple adjacent columns.

The sorting scheme may be based at least in part on a chronological order.

The sorting scheme may be based at least in part on a reverse chronological order.

The sorting scheme may be based solely on a reverse chronological order.

The sorting scheme may be based at least in part on a popularity rating.

The sorting scheme may be based at least in part on a number of views.

The category may include media and the sorting scheme may be based at least in part on a length of the media.

The URL to the leaf pages may be omitted from the sublinks.

The method may further include identifying a plurality of section pages associated with the webpage, wherein the plurality of section pages are webpages in the same website. The method may further include comparing leaf page signals related to the leaf pages to section signals related to the section pages before providing the sublinks to the plurality of leaf pages to display in combination with the main search result.

The category of each of the leaf pages may be based on the category of at least some of the search results.

The webpage may be a top level webpage of the website.

The method may further include determining whether the search query is navigational to the webpage and only providing sublinks to the plurality of leaf pages to display in combination with the main search result as sublinks of the main search result when the search query is determined to be navigational to the webpage.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process a plurality of sublinks to leaf pages of a website for utilization in one or more meaningful search results. These sublinks represent new and/or uniquely presented sublinks that are derived from leaf pages associated with a webpage of the search results. The sublinks may be provided in combination with a selected search result of the search results returned by a search engine application to provide improved search results related to the selected search result.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
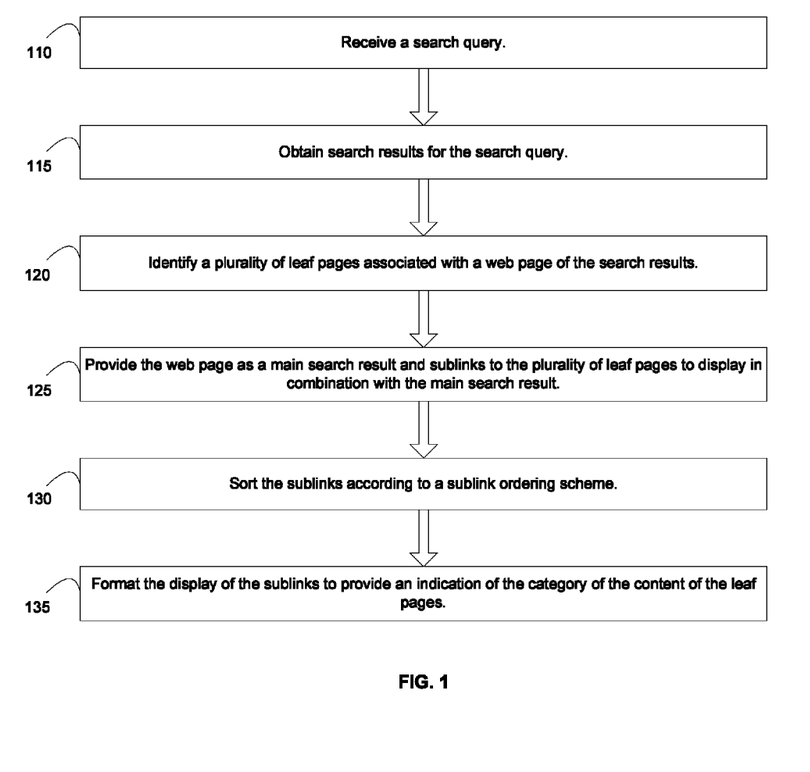
FIG. 1 is a flow chart illustrating an example method of providing leaf pages as sublinks for a webpage in response to a search query.

Referring to FIG. 1, a flow chart illustrating steps of an implementation of a method of providing leaf pages as sublinks for a webpage in response to a search query is illustrated. A leaf page of a given webpage is another webpage in the same website as the given webpage, that is lower in the hierarchy of the website than the given webpage, and that is directed toward specific content of the website. For example, in some implementations the leaf pages described herein may include webpages that are directed toward a specific news article, a specific video, a specific blog post, a specific forum topic, a specific image, a specific audio file, a specific book, a specific informational article, a specific review, a specific social networking profile page, a specific software application, and/or a specific product. The leaf pages may provide access to content via one or more applications executing on a computing device. In some implementations one or more of the leaf pages may be terminus webpages of the website's navigational hierarchy. In other words, in some implementations one or more of the leaf pages may be end pages in a hierarchy mapping of the website and contain no webpages mapped below them, but may optionally contain one or more links to other webpages of the website and/or other webpages outside of the website.

Other implementations may perform the steps of FIG. 1 in a different order, omit certain steps, and/or perform different and/or additional steps than those illustrated in FIG. 1. For convenience, aspects of FIG. 1 will be described with reference to a system of one or more computers that perform the process. The system may be, for example, the leaf page sublink generation engine 210 of FIG. 2 and/or the search engine 205 of FIG. 2.

Figure 2:
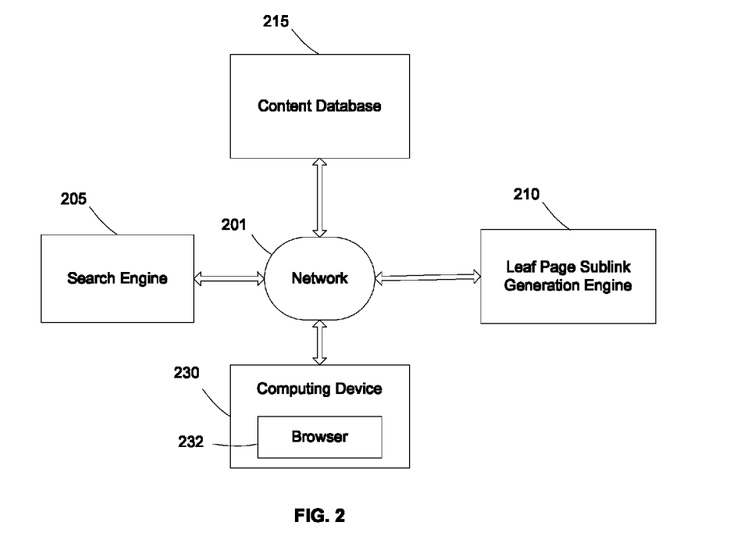
FIG. 2 is a block diagram of an example environment in which leaf pages may be provided as sublinks for a webpage in response to a search query.

At step 110 a search query is received. In some implementations the search query may be a navigational query, such as a navigational query that seeks a single website or web page of a single entity. In some implementations the search query may be received over a communications network. For example, the search query may be received by the search engine 205 from computing device 230 via communications network 201. Also, for example, the search query may optionally be received by the leaf page sublink generation engine 210 from the computing device 230 via communications network 201 (either directly or via the search engine 205).

At step 115 search results are obtained for the search query. In some implementations the search results may be obtained from the search engine 205. For example, the search results may be generated by the search engine 205 in response to the search query being received by the search engine 205 at step 105 and one or more of the search results may be provided to the leaf page sublink generation engine 210 by the search engine 201 via communications network 201. The search results may include results pertaining to one or more search result documents, such as one or more webpages, that are responsive to the search query that was received at step 105.

At step 120 a plurality of leaf pages are identified that are associated with a selected webpage of the search results and that are from the same website as the selected webpage. In some implementations one or more of the leaf pages are sub-pages of the selected webpage. For example, in some implementations one or more of the leaf pages may be direct sub-pages of the selected webpage one level down from the selected webpage in the website's navigational hierarchy. Also, for example, in some implementations one or more of the leaf pages may be sub-pages of the selected webpage that are more than one level down from the selected webpage in the website's navigational hierarchy. In some implementations one or more of the leaf pages are sub-pages of other webpages of the website of the selected webpage. In some implementations the search query may be analyzed to determine if it is a navigational query before the plurality of leaf pages are identified. In some implementations the plurality of leaf pages are identified and/or sublinks to the plurality of leaf pages are provided for display in combination with the one or more of the main search result only when the search query is navigational to the main search result.

In some implementations the leaf page sublink generation engine 210 may identify the plurality of leaf pages. For example, the leaf page sublink generation engine 210 may identify a plurality of leaf pages for a selected webpage from a database of selected and/or ranked leaf pages such as content database 215. Content database 215 may include one or more storage mediums having data pertaining to one or more websites and data pertaining to leaf pages associated with each of the websites. Also, for example, the leaf page sublink generation engine 210 may communicate with a leaf page selection and/or ranking engine that selects and/or ranks leaf pages for one or more websites and provides such leaf pages to leaf page sublink generation engine 210.

In some implementations a plurality of leaf pages may be identified in response to a request for a plurality of sublinks for a particular selected webpage of the search results. For example, in some implementations the search engine 205 may select one or more webpages of the generated search results and request sublinks from the leaf page sublink generation engine 210 for such selected webpages. For instance, the search engine 205 may select a webpage that is the top result among the search results and request sublinks from the sublink generation engine 210 for that top result selected webpage. Also, for instance, the search engine 205 may identify one or more webpages of search results that have at least a threshold click-through rate for the submitted query and request sublinks from the leaf page sublink generation engine 210 for such webpages. In some implementations only a predetermined number of leaf pages may be identified for the selected webpage. In some implementations the number of leaf pages identified may be dependent on one or more characteristics of the leaf pages such as, for example, popularity, content, type, and/or time-stamp of the leaf pages.

In some implementations a plurality of search results for a search query may be obtained and the search results and/or the search query analyzed to select one or more webpages of the search results for which a plurality of leaf pages should be identified. For example, in some implementations the leaf page sublink generation engine 210 may obtain a search query and/or search results for the search query and analyze the search query and/or the search results to select one or more webpages of the search results for which a plurality of leaf pages should be identified. For example, in some implementations, the leaf page sublink generation engine 210 may compare search results to a white-list of webpages for which it is desirable to identify leaf pages when such webpages are in the top of the search results. Also, for example, in some implementations the leaf page sublink generation engine 210 may identify one or more webpages of search results that have at least a threshold click-through rate for the submitted search query.

At step 120, a determination may optionally be made as to which category of leaf pages should be identified for the selected webpage. For example, if a website of the selected webpage has leaf pages of multiple categories, a determination may be made as to which one or more categories of the multiple categories of leaf pages should be identified. Categories of leaf pages may include, for example, news article leaf pages, video leaf pages, blog post leaf pages, image leaf pages, audio file leaf pages, book leaf pages, informational article leaf pages, social networking profile leaf pages, software application leaf pages, and/or specific product leaf pages.

One or more inputs may be utilized in determining which category or categories of leaf pages should be identified for the selected webpage in response to a given search query. In some implementations the top search results obtained for a search query and the categories of the top search results may be analyzed in determining which category or categories of leaf pages should be identified for the selected webpage. For example, in some implementations if the top search results include a significant number of videos, then it may be determined that video leaf pages should be identified for the selected webpage. Also, for example, in some implementations if the top search results include a significant number of blog posts, then it may be determined that blog post leaf pages should be identified for the selected webpage. In some implementations one or more signals from a news engine may be utilized in determining which category or categories of leaf pages should be identified for the selected webpage. For example, in some implementations if a number of high quality news search results are identified for a given search query, then it may be determined that news article leaf pages and/or news video pages should be identified for the selected webpage. In some implementations the search query may be analyzed in determining which category or categories of leaf pages should be identified for the selected webpage. For example, in some implementations the search query may be analyzed to determine if it relates to current events and/or one or more categories of leaf pages. Also, for example, in some implementations if the search query contains a keyword such as "news" it may be determined that news article leaf pages should be identified for the selected webpage.

In some implementations a manually curated whitelist of webpages, websites, and/or queries that are mapped to one or more specific categories of leaf pages that should be displayed may be consulted in determining which category or categories of leaf pages should be identified for the selected webpage. For example, in some implementations a whitelist may map the website of the selected webpage to a specific category of leaf pages. Also, for example, in some implementations an analysis of the content that appears directly on the selected webpage and/or other webpage of the website of the selected webpage may be analyzed. For instance, if the selected webpage contains only videos and articles, then it may be determined that article leaf pages and video leaf pages should be identified for the selected webpage.

In some implementations any content that is linked to directly from the selected webpage and/or other webpages of the website of the selected webpage may be analyzed in determining which category or categories of leaf pages should be identified for the selected webpage. For example, in some implementations if the selected webpage contains links to a significant number of product webpages then it may be determined that product leaf pages should be identified for the selected webpage. In some implementations the terms that appear on the selected webpage and/or other webpages of the website of the selected webpage may be analyzed in determining which category or categories of leaf pages should be identified for the selected webpage. For example, in some implementations if the terms on the selected webpage indicate frequently updated news is presented on the selected webpage, then it may be determined that news article leaf pages should be identified for the webpage. In some implementations the "freshness" of the selected webpage and/or other webpages of the website of the selected webpage may be analyzed and/or the freshness of other search results that are returned for the search query may be analyzed in determining which category or categories of leaf pages should be identified for the selected webpage. In some implementations the freshness of a webpage may be based on the rate at which the webpage is updated and/or time stamps associated with content of the webpage. In some implementations user-specific information, which may optionally be anonymized and not traceable to a particular user may be utilized in determining which category or categories of leaf pages should be identified for the selected webpage. For example, in some implementations the category of the content from a website that is most often visited and/or shared by one or more users may be analyzed and it may be determined that such content should correspond to the content of leaf pages identified for webpages of that website. For example, if news articles are the category of content most often visited and/or shared by one or more users of a website (such as the user submitting the search query), then it may be determined that news articles leaf pages should be identified for webpages of that website.

In other implementations additional and/or alternative inputs may be utilized in determining which category or categories of leaf pages should be identified for the selected webpage in response to a given search query. Although various inputs are described separately herein, multiple inputs may optionally be utilized in combination in determining which category or categories of leaf pages should be identified for the selected webpage.

At step 120, a determination may optionally be made as to whether to identify a plurality of leaf pages as sublinks instead of or in addition to identifying a plurality of section pages as sublinks. Section pages are webpages of a website that are directed to a grouping of content such as, for example, a primary news section of a website having a listing of multiple news stories, a primary video section of a website having a listing of multiple videos, and/or a primary content section of a website having a listing of links for specific content. Section pages may have one or more webpages that are branched from them in the hierarchy of a website. For example, for a selected webpage for which it is desirable to provide sublinks in displaying a search result for the webpage, it may be determined whether to provide only leaf page sublinks, only section page sublinks, or a combination of leaf page sublinks and section page sublinks. In some implementations one or more signals related to the section pages and/or one or more signals related to the leaf pages may be analyzed.

One or more inputs may be utilized in determining whether to identify a plurality of leaf pages as sublinks for a selected webpage instead of or in addition to a plurality of section pages. In some implementations the top search results obtained for a search query and the categories of the top search results may be analyzed. For example, in some implementations if the top search results include a significant number of leaf pages from any website, then it may be desirable to include leaf pages as sublinks for the selected webpage. Also, for example, in some implementations if the top search results include a significant number of recently time-stamped results that are of a high quality for the search query, then it may be desirable to include leaf pages as sublinks for the selected webpage. Also, for example, if the search query produces a number of high quality news search results, then it may be determined that it is desirable to include leaf pages as sublinks for the selected webpage. In some implementations the quality of the section pages used as sublinks may be analyzed in determining whether to include leaf pages as sublinks for a selected webpage. For example, in some implementations if the quality of one or more of the section pages used as a sublink for a selected webpage is determined to be relatively low as compared to a predetermined value and/or the quality of leaf pages for the webpage, it may be desirable to instead utilize a leaf page as a sublink for the selected webpage. The quality of a section page and/or a leaf page may be determined based on one or more of a variety of factors such as, for example: the quality of the page for the search query; the click-through rate of the page; the amount of traffic to the page; and/or links from other websites to the page. In some implementations the search query may be analyzed in determining whether to include leaf pages as sublinks for a selected webpage. For example, in some implementations if the search query contains a keyword such as "news" then it may be desirable to include leaf pages as sublinks for the selected webpage. For example, it may be desirable to include news article leaf pages as sublinks for the selected webpage. Also, for example, in some implementations if the search query is determined to be a navigational query it may be desirable to include leaf pages as sublinks for the selected webpage. In some implementations a manually curated whitelist of webpages, websites, and/or queries that are flagged as being desirable for including leaf pages as sublinks may be consulted in determining whether to include leaf pages as sublinks for a selected webpage. For example, in some implementations a whitelist may flag a plurality of webpages that, when returned as a top search result, should include leaf pages as sublinks to the search result. In some implementations analysis of the content that appears directly on the selected webpage and/or other webpage of the website of the selected webpage may be analyzed in determining whether to include leaf pages as sublinks for a selected webpage. For example, in some implementations if the selected webpage contains frequently updated blog postings, then it may be determined that it is desirable to include leaf pages as sublinks for the selected webpage.

In some implementations any content that is linked to directly from the selected webpage and/or other webpage of the website of the selected webpage may be analyzed in determining whether to include leaf pages as sublinks for a selected webpage. For example, in some implementations if the selected webpage contains links to a significant number of recently time-stamped news articles then it may be desirable to include leaf pages as sublinks for the selected webpage. In some implementations the terms that appear on the selected webpage and/or other webpage of the website of the selected webpage may be analyzed in determining whether to include leaf pages as sublinks for a selected webpage. For example, in some implementations, if the terms on the selected webpage indicate frequently updated news is presented on the selected webpage, then it may be desirable to include leaf pages as sublinks for the selected webpage. In some implementations the "freshness" of the selected webpage and/or other webpage of the website of the selected webpage may be analyzed and/or the freshness of other search results that are returned for the search query may be analyzed in determining whether to include leaf pages as sublinks for a selected webpage. The freshness of a webpage may be based on, for example, the rate at which the webpage is updated and/or time stamps associated with current content of the webpage. In some implementations the fresher the webpage is, the greater the desire is to include leaf pages as sublinks for the webpage. In some implementations user-specific information, which may be optionally anonymized and optionally not traceable to a particular user may be utilized in determining whether to include leaf pages as sublinks for a selected webpage. For example, in some implementations the category of the content from a website that is most often visited and/or shared by users may be analyzed to determine whether it is desirable to include leaf pages as sublinks for the selected webpage.

In other implementations additional and/or alternative inputs may be utilized in determining whether to identify a plurality of leaf pages as sublinks instead of or in addition to a plurality of section pages. Also, although various example inputs are described separately herein, multiple inputs may optionally be utilized in combination in determining whether to identify a plurality of leaf pages as sublinks instead of or in addition to a plurality of section pages.

At step 125 the webpage is provided as a main search result and sublinks to the leaf pages are provided to display in combination with the main search result. In some implementations the search engine 205 may provide the webpage as a main search result and the leaf page sublink generation engine 210 may provide sublinks to the plurality of leaf pages to display in combination with the main search result. For example, in some implementations the search engine 205 may identify the webpage as the main search result and the leaf page sublink generation engine 210 may provide links to the plurality of leaf pages to the search engine 205 for display as sublinks for the main search result. A main search result as used herein references a selected webpage from search results for a search query for which leaf page sublinks are displayed. A link to the selected search result is provided to a user in response to a search query in such a manner that it represents the main search result and the sublinks to the leaf pages associated with the webpage of the main search result are displayed in a subordinate manner in combination with the main search result. In some implementations the main search result may be displayed on the first page of the search results and in some versions of those implementations the main search result may be displayed as the first listed search result.

At step 130 the sublinks are sorted according to a sublink ordering scheme. In some implementations the leaf page sublink generation engine 210 may sort the sublinks according to a sublink ordering scheme and may provide the sublinks to the search engine 205 along with sorting information. In some implementations the search engine 205 may sort the sublinks according to a sublink ordering scheme.

In some implementations the sublink ordering scheme may be unique from the search result ordering scheme that is utilized to order the search results. In other words, the ordering of the sublinks may be ordered according to a scheme that does not necessarily place the sublinks in the order in which they would appear if present in the search results for the search query. For example, in some implementations if a given sublink were among the search results for the search query and would be listed first in the search results among other sublinks that may be present in the search results for the search query, the ordering scheme may not necessarily place the given sublink first in the sublink ordering scheme. In some versions of these implementations the sublink ordering scheme may be entirely independent of the search result ordering scheme.

In some implementations the sublink ordering scheme may be based on the category or categories of the leaf pages of the sublinks, the content of the webpage of the main search result, and/or the content of other aspects of the website of the main search result and the sublinks. For example, in some implementations if the leaf pages of the sublinks are video leaf pages, then the ordering scheme may be based on reverse chronological order. For instance, the ordering scheme may be based solely on reverse chronological order. Also, for example, in some implementations if the leaf pages of the sublinks are video leaf pages, then the ordering scheme may be based on chronological order. For instance, if each of a plurality of the video leaf pages represents one segment of a cohesive video, the segments may be ordered in chronological order to present the first video segment first to a user. In some implementations the chronological order or reverse chronological order may be based on the creation date of the videos and/or the date the videos were first posted on the respective video leaf pages. Also, for example, in some implementations if the leaf pages are blog leaf pages, then the ordering scheme may be based on reverse chronological order. In some implementations the reverse chronological order may be based on the posting date of the blog leaf pages. Also, for example, in some implementations if the leaf pages of the sublinks are audio leaf pages, then the ordering scheme may be based on chronological order. For instance, if each of a plurality of audio leaf pages represent audio segments intended to be listened to in a certain order (e.g., segments of a cohesive audio file, numbered tracks on an album), the segments may be ordered in a chronological order to present the first audio segment first to a user. Also, for example, in some implementations if the leaf pages of the sublinks are news article leaf pages, then the ordering scheme may be based on reverse chronological order and/or a prominence factor. The prominence factor may include, for example, the recent popularity of the leaf page as determined by recent traffic to the leaf page, placement of links to the leaf page on the website of the leaf page, and/or placement and/or presence of links to the leaf page from other websites. Also, for example, in some implementations if the leaf pages of the sublinks are news article leaf pages, then the ordering scheme may be based on a prominence signal received from a news engine such as a news aggregator that may determine prominence signals for news articles. Also, for example, in some implementations if the leaf pages of the sublinks are news video leaf pages, then the ordering scheme may be based on reverse chronological order and a prominence factor. Also, for example, in some implementations if the leaf pages are blog leaf pages, then the ordering scheme may be based on the ordering of the links to the leaf pages on other webpages of the website of the leaf pages such as the selected webpage. Also, for example, in some implementations if the leaf pages of the sublinks are video leaf pages, then the ordering scheme may be based on the ordering of the links to the leaf pages on other webpages of the website of the leaf pages such as the selected webpage. Also, for example, in some implementations if the leaf pages of the sublinks have multiple categories, then the ordering scheme may be based on the ordering of the links to the leaf pages on other webpages of the website of the leaf pages such as the selected webpage.

Also, for example, in some implementations if the leaf pages of the sublinks are profile leaf pages, then the ordering scheme may be based on the number of followers of the profiles of the leaf pages. Also, for example, in some implementations if the leaf pages of the sublinks are product leaf pages, then the ordering scheme may be based on a rating of the product of the leaf pages and/or the selling popularity of the product of the leaf pages. Also, for example, in some implementations if the leaf pages of the sublinks are software application leaf pages, then the ordering scheme may be based on a rating of the software application and/or the number of downloads of the software application. Also, for example, in some implementations if the leaf pages of the sublinks are location leaf pages, then the ordering scheme may be based on a rating of the location. Also, for example, in some implementations if the leaf pages of the sublinks are media leaf pages, then the ordering scheme may be based on the rating of the media, the number of views of the media by users, and/or the length of the media. For example, if the media includes videos, the videos may be ordered so that longer videos are more highly placed in the ordering scheme. Also, for example, if the media includes videos, the videos may be ordered based on a rating of the videos and the number of views of the videos by users, so that an ordering of a video may increase with an increase in rating and/or an increase in the number of views.

In other implementations additional and/or alternative criteria may be utilized in ordering the sublinks. Also, although various criteria are described separately herein, multiple criteria may optionally be utilized in combination in determining the ordering of sublinks.

At step 135 the display of the sublinks is formatted to provide an indication of the category of the content of the leaf pages. In some implementations the leaf page sublink generation engine 210 may partially or fully format the sublinks and may provide the formatted sublinks to the search engine 205. In some implementations the search engine 205 may additionally or alternatively partially or fully format the sublinks.

In some implementations a sublink may be displayed with an image from the leaf page of the sublink. For example, in some implementations an image from a news article leaf page may be displayed in combination with text from the news article. The text may optionally be fully or partially wrapped around the image and/or may be justified to suggest a newspaper-like layout. Also, for example, in some implementations sublinks to news article leaf pages may be displayed in multiple columns, optionally with text and/or images from the news article leaf pages, to suggest a multiple column newspaper-like layout. Also, for example, in some implementations sublinks to news article leaf pages may be displayed in multiple columns, optionally with one or more horizontal lines separating sublinks to suggest a newspaper-like layout. Also, for example, in some implementations sublinks to video leaf pages may be displayed with a video thumbnail that may optionally provide in-line play of the video. Also, for example, in some implementations sublinks to video leaf pages may include metadata about the video such as length, playback quality, rating, number of views, and/or format. Also, for example, in some implementations byline information for articles, videos, and/or images may be included such as date and/or authorship information. Also, for example, in some implementations sublinks to product leaf pages may be displayed with images of the product, price of the product, and/or attributes of the product. Also, for example, in some implementations sublinks to leaf pages may be displayed with icons corresponding to the content of the leaf pages. For instance, news article leaf pages may be displayed with a newspaper icon and/or video leaf pages may be displayed with a video icon.

The display of any titles of the sublinks may optionally be truncated and/or wrapped to multiple lines. Snippets of the leaf pages may also optionally be provided for display with the sublinks. In some implementations the snippets may be focused on the leading text of the leaf pages of the sublinks. For example, in some implementations snippets for news article leaf pages may focus on the leading text of the news article for display with the sublinks. In other implementations additional and/or alternative formatting may be utilized to provide an indication of the category of the content of the leaf pages.

The search engine 205 and/or leaf page sublink generation engine 220 may provide the main search result and the sublinks to the computing device 230 to display those search results to a user. For example, the computing device 230 may receive the main search result and the sublinks and display those in a listing of search results to be displayed to a user such as in the web browser 232 that is executing on the computing device 230. The sublinks may optionally be provided sorted according to step 130 and/or formatted according to step 135.

FIG. 2 illustrates a block diagram of an example environment in which leaf pages may be provided as sublinks for a webpage in response to a search query. The environment includes a communication network 201 that allows for communication between various components of the environment. The communication network 201 facilitates communication between the various components in the environment. In some implementations the communication network may include the Internet, one or more intranets, and/or one or more bus subsystems. The communication network 201 may optionally utilize one or more standard communications technologies, protocols, and/or inter-process communication techniques.

The leaf page sublink generation engine 210 may access a database of leaf pages from content database 215 or elsewhere and utilize such database to identify a plurality of leaf pages associated with a webpage and generate sublinks for those leaf pages utilizing techniques as described herein. In some implementations leaf page sublink generation engine 210 may perform one or more of the steps of the method of FIG. 1. The leaf page sublink generation engine 210 may be implemented in hardware, firmware, and/or software running on hardware. For example, the leaf page sublink generation engine 210 may be implemented in one or more computer servers.

The search engine 205 may communicate with the leaf page sublink generation engine 210 to process a submitted search query and provide search results for the submitted search query that include a main search result and sublinks to the main search result. In some implementations a user may interact with the search engine 205 through a computing device 230. The computing device 230 and the search engine 205 each include memory for storage of data and software applications, a processor for accessing data and executing applications, and components that facilitate communication over a communication network 201. The computing device 230 executes one or more applications, such as web browser 232, that enable the user to formulate search queries and submit them to the search engine 205. The search engine 205 receives a search query from the computing device 230 and executes the query against a search engine content database, such as a search engine content database implemented in content database 215, of available webpages. The search engine 205 identifies webpages that match the submitted query and responds by generating search results that are transmitted to the computing device 230 in a form that can be presented to the user. For example, in response to a query from the computing device 230, the search engine 205 may transmit a plurality of search results to be displayed in the web browser 232 that is executing on the computing device 230. Also, for example, as described herein, in response to a query from the computing device 230, the search engine 205 may generate search results, obtain leaf page sublinks for one or more of the search results, and transmit the search results and the leaf page sublinks to be displayed in the web browser 232 that is executing on the computing device 230. The search engine 205 may be implemented in hardware, firmware, and/or software running on hardware. For example, the search engine 205 may be implemented in one or more computer servers.

Many other configurations are possible having more or less components than the environment shown in FIG. 2. For example, although the leaf page sublink generation engine 210 is illustrated alone in FIG. 2, it is understood that all or aspects of the leaf page sublink generation engine 210 may optionally be combined with the search engine 205 in some implementations.

Figure 3:
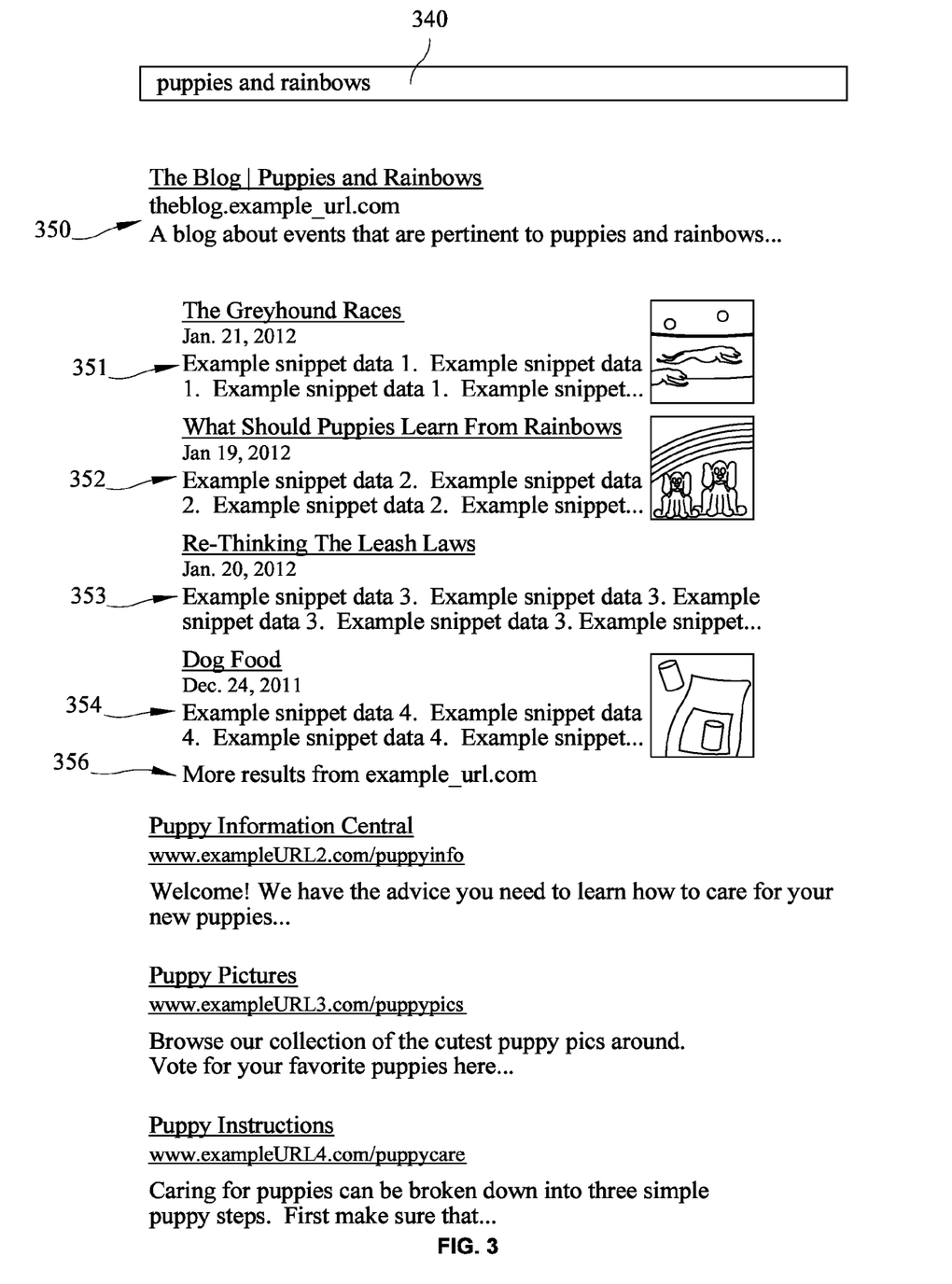
FIG. 3 illustrates an example of an interface screen provided to a user in response to a search query.

FIG. 3 illustrates an example of an interface screen provided to a user in response to a search query. In some implementations the interface screen may be provided to a user via the web browser 232 executing on the computing device 230. The interface screen illustrates that the search engine query was "puppies and rainbows" as indicated at box 340. To provide an indication of the capability of providing time-sensitive or fresh leaf pages as sublinks in response to a search query, the presented search engine query of FIG. 3 presents example search results from an example prior date of Jan. 21, 2012. A number of search query results are returned for the search query. Only four of the search results are illustrated in FIG. 3 for simplicity. The first search result provided on the interface screen at area 350 is a main search result for the webpage theblog.example_url.com and includes a hyperlink to theblog.example_url.com. In some implementations the search query "puppies and rainbows" may be navigational to the theblog.example_url.com website.

Four sublinks are provided on the interface screen at areas 351-354 as sublinks of the main search result at area 350. The four sublinks are provided below the main search result and are indented with respect to the main search result to indicate that they are sublinks of the main search result. The sublinks are to blog post leaf pages from the webpage theblog.example_url.com of the Puppies and Rainbows website. The sublinks each contain a title presented with underlining and in larger text that may be selected by a user to enable the user to navigate to the leaf page associated with the sublink. Other aspects of the sublinks may additionally or alternatively be selected by a user to navigate to the leaf page associated with the sublink. Each sublink also contains a byline on the line following the title that includes time-stamp information to indicate the date of the blog posting. The sublinks each also contain snippet information from the leaf page to provide more detailed information on the content of the leaf page. The first, second, and fourth sublinks each contain an image, which is from the corresponding leaf page, that is presented to the right of the title, the byline information, and the snippet information and provides an indication of the content of the leaf page. As described herein, the ordering of the sublinks may be unique from any ordering that would be created by a search result ordering scheme utilized to order the search results and/or may be unique from an ordering scheme that would order the sublinks by popularity only. For example, the third sublink may be a better search result for the search query than the first sublink and/or may be more popular than the first sublink, but presented after the first sublink because it is time-stamped nearly a month before the first sublink.

An additional results link at area 356 is also provided following the listing of the sublinks and may be used to indicate that additional results associated with the website may be available. In some implementations selecting the additional results link may provide additional links from the website to the computing device 230. The additional links may optionally include links to additional leaf pages associated with the webpage theblog.example_url.com and/or with the Puppies and Rainbows website.

Figure 4:
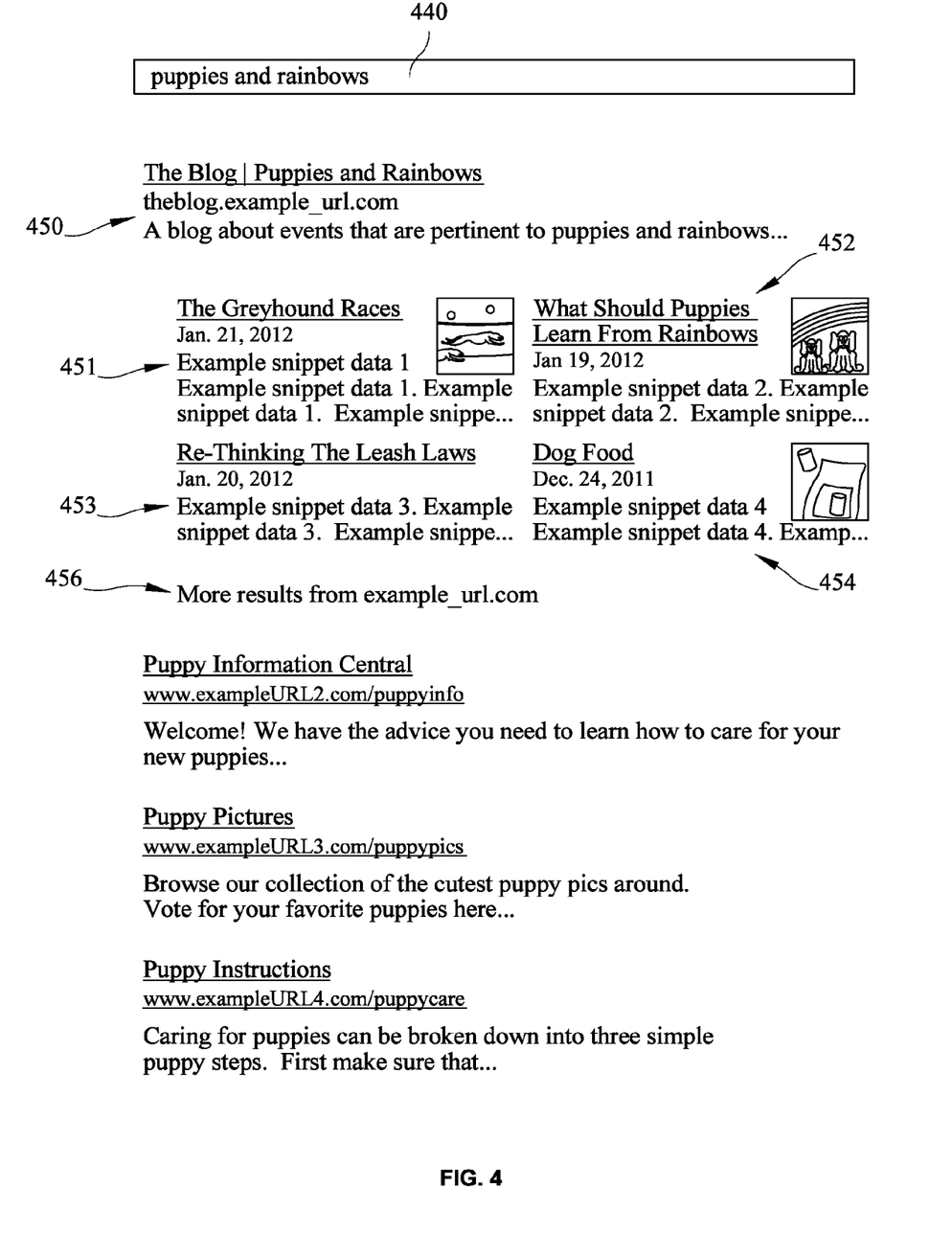
FIG. 4 illustrates another example of an interface screen provided to a user in response to a search query.

FIG. 4 illustrates another example of an interface screen provided to a user in response to a search query. In some implementations the interface screen may be provided to a user via the web browser 232 executing on the computing device 230. The interface screen illustrates that the search engine query was "puppies and rainbows" as indicated at box 440. To provide an indication of the capability of providing time-sensitive or fresh leaf pages as sublinks in response to a search query, the presented search engine query of FIG. 4 presents example search results from an example prior date of Jan. 21, 2012. A number of search query results are returned for the search query. Only four of the search results are illustrated in FIG. 4 for simplicity. The first search result provided on the interface screen at area 450 is a main search result for the webpage theblog.example_url.com and includes a hyperlink to theblog.example_url.com.

Four sublinks are provided on the interface screen at areas 451-454 as sublinks of the main search result at area 450. The four sublinks are provided below the main search result and are indented with respect to the main search result to indicate that they are sublinks of the main search result. The sublinks are to blog post leaf pages from the webpage theblog.example_url.com of the Puppies and Rainbows website. The sublinks each contain a title presented with underlining and in larger text, which may be selected by a user to enable the user to navigate to the leaf page associated with the sublink. Other aspects of the sublinks may additionally or alternatively be selected by a user to navigate to the leaf page associated with the sublink. Each sublink also contains a byline on the line following the title that includes time-stamp information to indicate the date of the blog posting. Each sublink also contains snippet information from the leaf page to provide more detailed information on the content of the leaf page. The first, second, and fourth sublinks each contain an image from the corresponding leaf page, which is presented to the right of the title; and the byline information, which is wrapped by the snippet information. The sublinks of FIG. 4 are presented in a 2×2 layout with two separate columns and two separate rows, generally evoking an example of a newspaper layout to a viewer. As described herein, the ordering of the sublinks may be unique from any ordering that would be created by a search result ordering scheme utilized to order the search results and/or may be unique from an ordering scheme that would order the sublinks by popularity only.

An additional results link at area 456 is also provided following the listing of the sublinks and may be used to indicate that additional results associated with the website may be available. In some implementations selecting the additional results link may provide additional links from the website to the computing device 230. The additional links may optionally include links to additional leaf pages associated with the webpage theblog.example_url.com and/or with the Puppies and Rainbows website.

Figure 5:
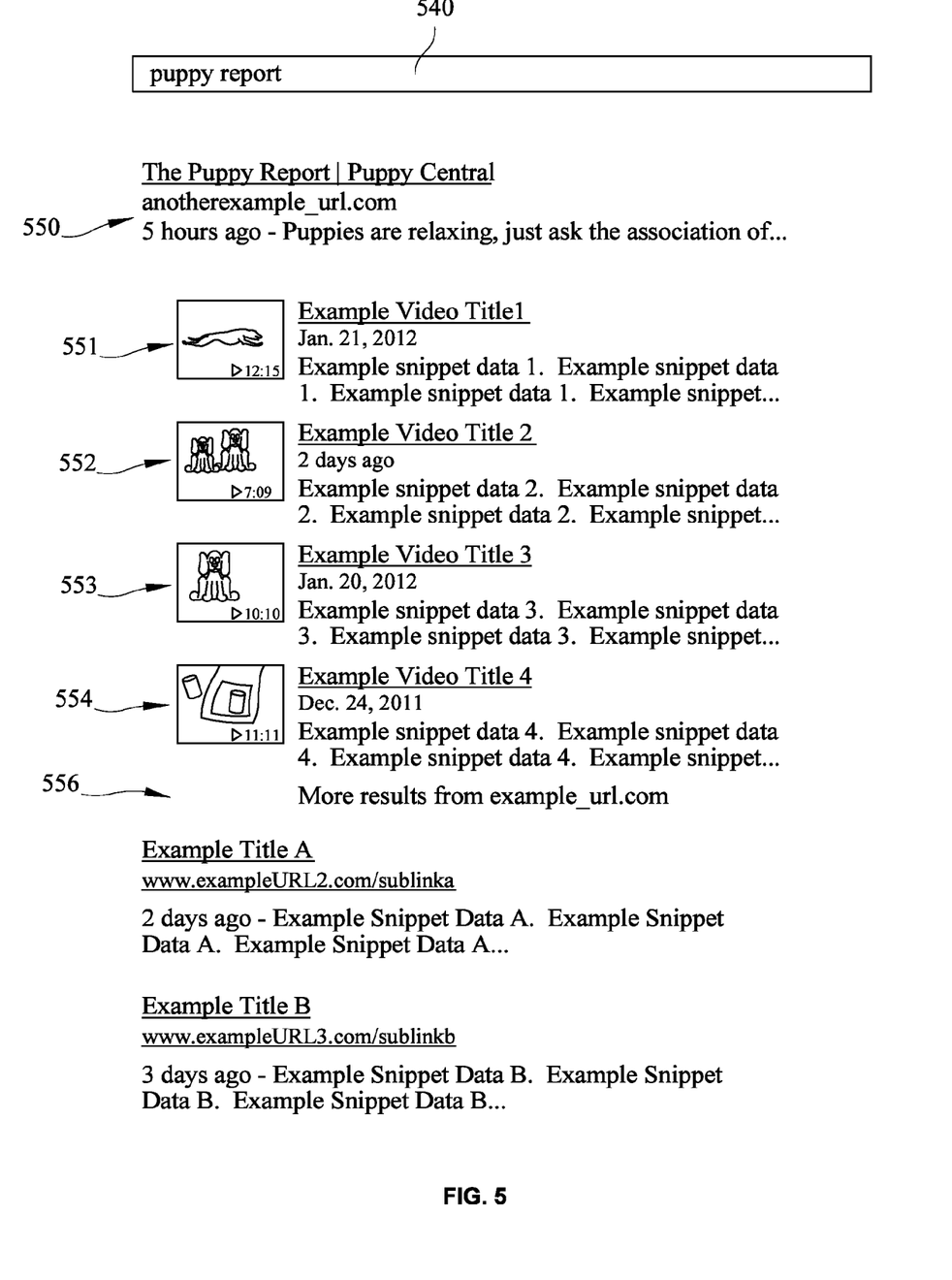
FIG. 5 illustrates another example of an interface screen provided to a user in response to a search query.

FIG. 5 illustrates another example of an interface screen provided to a user in response to a search query. In some implementations the interface screen may be provided to a user via the web browser 232 executing on the computing device 230. The interface screen illustrates that the search engine query was "puppy report" as indicated at box 540. To provide an indication of the capability of providing time-sensitive or fresh leaf pages as sublinks in response to a search query, the presented search engine query of FIG. 5 presents example search results from an example prior date of Jan. 21, 2012. A number of search query results are returned for the search query. Only three of the search results are illustrated in FIG. 5 for simplicity. The first search result provided on the interface screen at area 550 is a main search result for the webpage anotherexample_url.com of the website The Puppy Report and includes a hyperlink to anotherexample_url.com. In some implementations the search query "puppy report" may be navigational to the anotherexample_url.com website.

Four sublinks are provided on the interface screen at areas 551-554 as sublinks of the main search result at area 550. The four sublinks are provided below the main search result and are indented with respect to the main search result to indicate that they are sublinks of the main search result. The sublinks are to video leaf pages from The Puppy Report website. The sublinks each contain a title presented with underlining and in larger text, which may be selected by a user to enable the user to navigate to the leaf page associated with the sublink. Other aspects of the sublinks may additionally or alternatively be selected by a user to navigate to the leaf page associated with the sublink. Each sublink also contains a byline on the line following the title that includes time-stamp information to indicate the date of the video. Each sublink also contains snippet information from the corresponding leaf page to provide more detailed information on the content of the leaf page. The sublinks each contain a screen shot from the video of the corresponding leaf page that is presented to the left of the title and byline information. As described herein, the ordering of the sublinks may be unique from any ordering that would be created by a search result ordering scheme utilized to order the search results and/or may be unique from an ordering scheme that would order the sublinks by popularity only.

An additional results link at area 556 is also provided following the listing of the sublinks and may be used to indicate that additional results associated with the website may be available. In some implementations selecting the additional results link may provide additional links from The Puppy Report website to the computing device 230. The additional links may optionally include links to additional video leaf pages and/or links to other webpages within The Puppy Report website.

Figure 6:
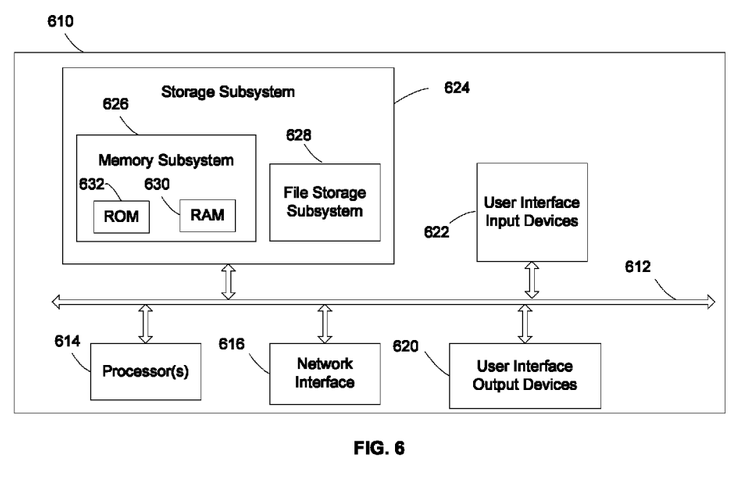
FIG. 6 illustrates a block diagram of an example computer system.

FIG. 6 is a block diagram of an example computer system 610. Computer system 610 typically includes at least one processor 614 that communicates with a number of peripheral devices via bus subsystem 612. These peripheral devices may include a storage subsystem 624, including, for example, a memory subsystem 626 and a file storage subsystem 628, user interface input devices 622, user interface output devices 620, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to provide leaf pages as sublinks for a webpage in response to a search query according to one or more processes described herein.

These software modules are generally executed by processor 614 alone or in combination with other processors. Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 628 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive implementations have been described and illustrated herein, a variety of other means and/or structures for performing the function and/or obtaining the results and/or one or more of the advantages described herein, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method, comprising:
    receiving a search query from a user;
    obtaining search results based on the search query;
    identifying a plurality of leaf pages associated with a webpage of the search results, wherein the plurality of leaf pages and the webpage are webpages in a same website, wherein the plurality of leaf pages are directed to at least one category of a plurality of predefined categories of content, and wherein at least some of the plurality of leaf pages are terminus webpages in the navigational hierarchy of the website;
    providing the webpage as a main search result to the search query;
    providing sublinks to the plurality of leaf pages to display in combination with the main search result as sublinks of the main search result; and
    identifying the at least one category of the plurality of leaf pages and sorting the sublinks according to a sorting scheme of the category.

2. The method of claim 1, wherein the sorting scheme is unique from a search result ordering scheme utilized to order the search results.

3. The method of claim 1, wherein the category includes episodic video content and wherein the sorting of the episodic content is in reverse chronological order.

4. The method of claim 1, wherein the category includes news articles and wherein the sorting of the news articles is based on reverse chronological order.

5. The method of claim 1, wherein the category includes at least one of a news story, an article, a review, a video, an image, an audio clip, a blog post, a forum, a review, a social networking profile page, and a product page.

6. The method of claim 5, wherein the leaf pages are children pages of section pages of the website.

7. The method of claim 1, further comprising formatting display properties of the sublinks to provide an indication of the category of the leaf pages of the sublinks.

8. The method of claim 7, wherein the category includes news, video, and blog posting.

9. The method of claim 7, wherein the step of formatting the display of the sublinks to provide an indication of the category of the leaf pages includes formatting at least some news sublinks of the plurality of sublinks to include an image from the news leaf page and text from the news leaf page at least partially wrapped around the image.

10. The method of claim 9, wherein the text is justified.

11. The method of claim 1, wherein the sorting scheme is based at least in part on one of a chronological order and a reverse chronological order.

12. The method of claim 1, wherein the sorting scheme is based solely on a reverse chronological order.

13. The method of claim 1, further comprising identifying a plurality of section pages associated with the webpage, wherein the plurality of section pages are webpages in the same website.

14. The method of claim 13, further comprising comparing leaf page signals related to the leaf pages to section signals related to the section pages before providing the sublinks to the plurality of leaf pages to display in combination with the main search result.

15. A system including memory and one or more processors operable to execute instructions stored in the memory, comprising instructions to:
    receive a search query from a user;
    obtain search results based on the search query;
    identify a plurality of leaf pages associated with a webpage of the search results, wherein the plurality of leaf pages and the webpage are webpages in a same website, wherein the plurality of leaf pages are directed to at least one category of a plurality of predefined categories of content, and wherein at least some of the plurality of leaf pages are terminus webpages in the navigational hierarchy of the website;
    provide the webpage as a main search result to the search query; and
    provide sublinks to the plurality of leaf pages to display in combination with the main search result as sublinks of the main search result; and
    identify the at least one category of the plurality of leaf pages and sorting the sublinks according to a sorting scheme of the category.

16. The system of claim 15, wherein the sorting scheme is unique from a search result ordering scheme utilized to order the search results.

17. The system of claim 15, wherein the category includes episodic video content and wherein the sorting of the episodic content is in reverse chronological order.

18. The system of claim 15, wherein the category includes news articles and wherein the sorting of the news articles is based on reverse chronological order.

19. The system of claim 15, wherein the instructions further comprise instructions to format display properties of the sublinks to provide an indication of the category of the leaf pages of the sublinks.

20. The system of claim 19, wherein the instruction to format the display of the sublinks to provide an indication of the category of the leaf pages includes formatting at least some news sublinks of the plurality of sublinks to include an image from the news leaf page and text from the news leaf page at least partially wrapped around the image.

21. The system of claim 15, wherein the sorting scheme is based at least in part on one of a chronological order and a reverse chronological order.

22. The system of claim 15, wherein the instructions further comprise instructions to identify a plurality of section pages associated with the webpage, wherein the plurality of section pages are webpages in the same website.

23. The system of claim 22, wherein the instructions further comprise instructions to compare leaf page signals related to the leaf pages to section signals related to the section pages before providing the sublinks to the plurality of leaf pages to display in combination with the main search result.

24. A non-transitory computer readable storage medium storing computer instructions executable by a processor to perform a method, the method comprising:
- receiving a search query from a user;
- obtaining search results based on the search query;
- identifying a plurality of leaf pages associated with a webpage of the search results, wherein the plurality of leaf pages and the webpage are webpages in a same website, wherein the plurality of leaf pages are directed to at least one category of a plurality of predefined categories of content, and wherein at least some of the plurality of leaf pages are terminus webpages in the navigational hierarchy of website;
- providing the webpage as a main search result to the search query;
- providing sublinks to the plurality of leaf pages to display in combination with the main search result as sublinks of the main search result; and
- identifying the at least one category of the plurality of leaf pages and sorting the sublinks according to a sorting scheme of the category.

\* \* \* \* \*